US010252696B2

(12) United States Patent
Doshi et al.

(10) Patent No.: US 10,252,696 B2
(45) Date of Patent: Apr. 9, 2019

(54) RESTRAINT APPARATUS AND METHOD WITH ALERT (71) Applicant: Intel Corporation, Santa Clara, CA (US)

(72) Inventors: Kshitij A. Doshi, Chandler, AZ (US); George J. Chaltas, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/641,090

(22) Filed: Jul. 3, 2017

(65) Prior Publication Data

US 2018/0056935 A1 Mar. 1, 2018

Related U.S. Application Data (63) Continuation of application No. 14/660,631, filed on Mar. 17, 2015, now Pat. No. 9,714,003.

(51) Int. Cl.
*B60R 22/48* (2006.01)
*B60N 2/00* (2006.01)
(Continued)

(52) U.S. Cl.
CPC .............. *B60R 22/48* (2013.01); *B60N 2/002* (2013.01); *B60N 2/26* (2013.01); *G08B 21/02* (2013.01);
(Continued)

(58) Field of Classification Search
CPC ...................................................... B60R 22/48
(Continued)

(56) References Cited

U.S. PATENT DOCUMENTS 5,581,234 A 12/1996 Emery et al.
7,218,218 B1 5/2007 Rogers
(Continued)

FOREIGN PATENT DOCUMENTS

KR 10-2015-0015052 A 2/2015
WO WO 2007/060417 A1 5/2007

OTHER PUBLICATIONS

International Search Report and Written Opinion dated May 30, 2016 for International Application No. PCT/US2016/014964, 15 pages.
(Continued)

*Primary Examiner* — Qutbuddin Ghulamali
(74) *Attorney, Agent, or Firm* — Schwabe, Williamson & Wyatt, P.C.

(57) ABSTRACT

In embodiments, apparatuses, methods and storage media (transitory and non-transitory) are described that are associated with providing alerts to a caregiver in a vehicle. In various embodiments, an apparatus may include a first sensor coupled with a restraint to provide a restraint indicator, a second sensor coupled with a securing component to provide an attachment indicator, and an alert module operated by one or more processors to cause a wireless transmitter to transmit an alert signal based at least in part on the restraint indicator and the attachment indicator. In various embodiments, a warning apparatus may include an output device and a warning module operated by one or more processors to activate the output device based at least in part on a wireless alert signal from a car seat in a vehicle that indicates the car seat is in use.

16 Claims, 7 Drawing Sheets (51) Int. Cl.
  *B60N 2/26* (2006.01)
  *G08B 21/02* (2006.01)
  *G08B 21/22* (2006.01)
  *G08B 23/00* (2006.01)
  *G08B 25/10* (2006.01)
  *B60N 2/28* (2006.01)

(52) U.S. Cl.
  CPC ............ *G08B 21/22* (2013.01); *G08B 23/00* (2013.01); *G08B 25/10* (2013.01); *B60N 2002/2815* (2013.01); *B60R 2022/4816* (2013.01); *B60R 2022/4858* (2013.01)

(58) Field of Classification Search
  USPC ...................................................... 340/457.1
  See application file for complete search history.

(56) References Cited

U.S. PATENT DOCUMENTS

| | | | | |
|---|---|---|---|---|
| 7,714,737 | B1* | 5/2010 | Morningstar | B60N 2/002 180/271 |
| 2004/0164856 | A1 | 8/2004 | Mesina | |
| 2005/0194779 | A1 | 9/2005 | Ito et al. | |
| 2007/0075575 | A1* | 4/2007 | Gregory, II | B60N 2/002 297/217.3 |
| 2009/0079557 | A1 | 3/2009 | Miner | |
| 2010/0253504 | A1* | 10/2010 | Lliteras | G08B 21/22 340/539.11 |
| 2013/0033373 | A1 | 2/2013 | Thomas | |
| 2014/0085070 | A1 | 3/2014 | Schoenberg | |
| 2014/0253314 | A1* | 9/2014 | Rambadt | B60N 2/002 340/457.1 |

OTHER PUBLICATIONS

Extended European Search Report dated Sep. 5, 2018 for European Patent Application No. 16765371.6, 8 pages.

* cited by examiner

RESTRAINT APPARATUS AND METHOD WITH ALERT

CROSS REFERENCE TO RELATED APPLICATION

This application is a continuation of U.S. patent application Ser. No. 14/660,631, entitled "RESTRAINT APPARATUS AND METHOD WITH ALERT," filed Mar. 17, 2015, now U.S. Pat. No. 9,714,003, and claims priority to the Ser. No. 14/660,631 application. The entire disclosure of the Ser. No. 14/660,631 application is incorporated herein by reference.

TECHNICAL FIELD

The present disclosure relates to the field of restraint devices, in particular, to providing an alert based at least in part on whether a restraint on a device is secured and the device is coupled with a vehicle.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Attention lapses by caregivers may cause infants or children to be left behind in vehicles, potentially exposing them to elevated or reduced temperatures that may put them at risk of physical harm, in addition to any emotional trauma that may occur from being left alone. Existing devices may be based on a weight sensor and a distance of a baby seat from a car ignition key. These solutions may be problematic in requiring changes to car keys or awkward calibration of the weight sensing mechanism.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The term "module" may refer to software, firmware and/or circuitry that is/are configured to perform or cause the performance of one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, software and/or firmware that stores instructions executed by programmable circuitry. The modules may collectively or individually be embodied as circuitry that forms a part of a computing device. As used herein, the term "processor" may be a processor core.

Figure 1:
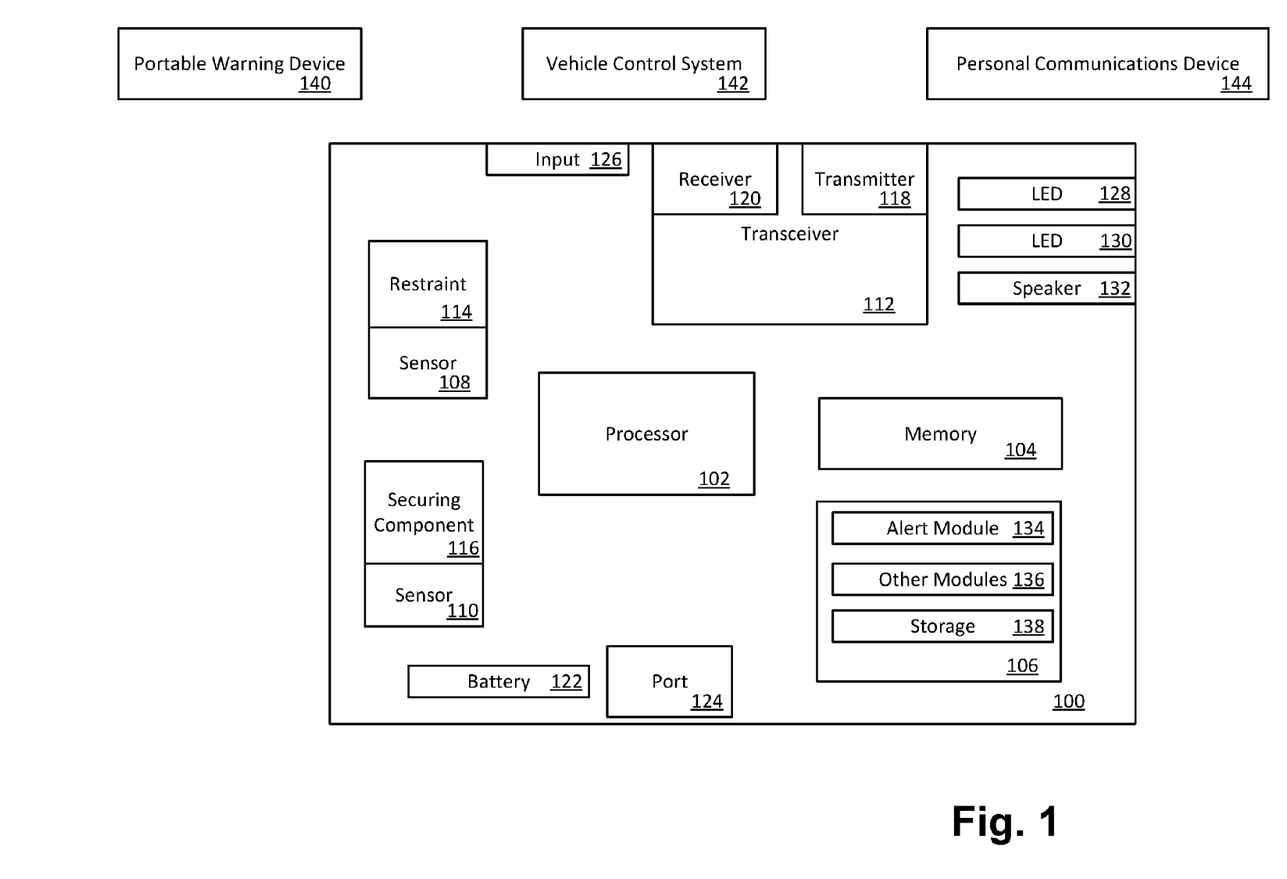
FIG. 1 is a block diagram of a device having a caregiver alert system, in accordance with various embodiments.

Referring now to FIG. 1, a device 100, incorporated with the caregiver alert teaching of the present disclosure, in accordance with various embodiments, is illustrated. As shown, device 100 may include a number of components 102-138, including a processor 102, a system memory 104, an execution environment 106, a restraint sensor 108, an attachment sensor 110, and a transceiver 112 that may be coupled together and configured to cooperate with each other to transmit an alert signal based at least in part on whether a restraint 114 is in a restraining position and a securing component 116 is engaged to couple the device 100 to a vehicle. In embodiments, the device 100 may be configured as an Internet of Things (IoT) device that can communicate and interoperate with various other devices and systems configured to function in an IoT environment. In various embodiments, the device 100 may be a child car seat or a portable infant carrier that includes the restraint 114 to securely keep a child or infant in the car seat and the securing component 116 to securely attach the car seat to a vehicle. The restraint 114 may be a five point buckling harness, for example. The restraint 114 may be configured differently in other embodiments. In embodiments, the securing component 116 may be a portion of the car seat structured to receive a vehicle seat belt and/or one or more straps with fasteners for attachment to anchor points or tether points in the vehicle.

The transceiver 112 may include a transmitter 118 and a receiver 120 in various embodiments. The transceiver 112 may be a low power Bluetooth radio-frequency device that may operate according to at least one of the standards defined by the Bluetooth Special Interest Group, for example. In some embodiments, the device 100 may include only the transmitter 118 rather than having a transceiver that includes both receiving and transmitting components. A battery 122 may be used to power the device 100 and a port 124 may be used to recharge the battery 122 when needed and/or to power the device 100 when the battery 122 is at a low charge level. The port 124 may be a universal serial bus (USB) port that accepts a cord that may be connected to a standard USB charging device that may be integrated into the vehicle or provided by using a standard adapter with a power receptacle in the vehicle. In embodiments, the device 100 may also include an input mechanism 126 that may be a manual activation component such as a push button switch in various embodiments. The input mechanism 126 may also be structured to be operable by a caregiver but not a child or infant seated in the device 100 in embodiments. The device 100 may include various output components such as a first LED 128 to indicate when the device 100 is active and a second LED 130 to indicate when the battery 122 has a sufficient charge level to power the device 100. The device 100 may also include an audio output component such as a speaker 132 to sound a periodic beep when a charge level of the battery 122 reaches a predetermined level that indicates it will soon be too low to power the device 100.

In embodiments, the restraint sensor 108 may provide a restraint indicator based at least in part on whether the restraint 114 is in a restraining position. For example, if a five point harness is properly buckled, the restraint indicator may indicate the restraint 114 is in a restraining position. In embodiments, the attachment sensor 110 may provide an attachment indicator based at least in part on whether the securing component 116 is engaged couple the device 100 to a vehicle. For example, the attachment indicator may indicate the securing component 116 is engaged to couple the device 100 to a vehicle when a seat belt is securely fastening the device 100 to a vehicle with the securing component 116 or when the device 100 is securely fastened to anchor points and/or tether points in the vehicle. The attachment sensor 110 may operate by sensing a tension level in one or more straps or a pressure exerted by a seat belt on the device 100 in various embodiments. In embodiments, the attachment sensor 110 may be a simple switch that is activated at a predetermined pressure level. In other embodiments, the attachment sensor 110 may provide an output that varies depending on a pressure or strain level exerted on the securing component 116. The securing component 116 may include a base component that can be attached to a vehicle as described above using a seat belt or straps attached to anchor points, and a latch to secure a portable infant carrier to the base component. In embodiments, the attachment sensor 110 may sense multiple securing components such as a plurality of straps attached to anchor points, or a base component attached to a vehicle and a portable infant carrier securely attached to the base component with the latch. Securing mechanisms other than a latch may be used in various embodiments.

In embodiments, the execution environment 106 may include an alert module 134 operated by the processor 102 to wirelessly transmit an alert signal with the transmitter 118 when the restraint sensor 108 provides a restraint indicator that indicates the restraint 114 is in a restraining position and the attachment sensor 110 provides an attachment indicator that indicates the securing component 116 is engaged to couple the device 100 to a vehicle. The alert module 134 may be operated by the processor 102 to stop wirelessly transmitting the alert signal when at least one of the restraint indicators indicates the restraint 114 is not in a restraining position or the attachment indicator indicates the securing component 116 is not engaged to couple the device 100 to the vehicle, in various embodiments. For example, if the buckle of a five point harness is released, the restraint indicator may indicate the restraint 114 is not in a restraining position or if a portable infant carrier is unlatched from its base component, the attachment indicator may indicate the securing component 116 is not engaged to couple the device 100 to the vehicle.

The execution environment 106 may also include other modules 136 and/or storage 138 in various embodiments. The execution environment 106 may also include an operating system (OS) operated by the processor 102. In embodiments, the OS may be an embedded computing OS and the processor 102 may be an embedded computing processor. In embodiments, the device 100 may wirelessly communicate unidirectionally or bidirectionally with other devices or systems such as a portable warning device 140, a vehicle control system 142, or a personal communications device 144 such as a smartphone or wearable computing device.

Generally, in the act of placing an infant or child in a vehicle, a caregiver secures the infant or child in a car seat such as the device 100, and in doing so the caregiver typically performs at least one manual step with the car seat itself, that may include placing a child that is already placed and restrained in a car seat into a vehicle along with the car seat followed by securing the car seat to the vehicle, or alternatively placing a child into a car seat that is already present and secured to a vehicle followed by securing a restraint. In embodiments, the device 100 may be automatically activated when either a child is secured in a car seat that is already affixed with a vehicle, or when the child is first secured into the car seat which is later secured to the vehicle. In other embodiments, the device 100 may be activated in a different manner such as by using a weight or pressure sensor to sense the presence of a child in the device either on its own or in combination with the restraint sensor 108 and/or the attachment sensor 110. The device 100 may be deactivated when the child is extracted from the car seat or a securing component such as the vehicle's seat belt or the device's anchor straps are released. In embodiments, the first LED 128 may light up to assure the caregiver that the device 100 is active when the child has been restrained in a car seat that is secured to the vehicle. In embodiments, the input mechanism 126 may be a button that allows the caregiver to manually activate the device 100 if for some reason the automatic activation is malfunctioning or if they wish to activate the device 100 manually even if it is not attached to a vehicle.

In embodiments, the device 100 may sound a periodic loud beep when a battery charge level of the device 100 is low and should be recharged or replaced. The device may also broadcast a 'battery needs recharging' message using the transceiver 112 over Bluetooth or wireless fidelity (WiFi), for example, as an additional means of notification. WiFi communications may operate according to at least one of the Institute of Electrical and Electronics Engineers (IEEE) 802.11 standards, for example. The second LED 130 may also indicate, when off, that the device 100 needs to be recharged. A vehicle based charging and/or powering mechanism that uses the port 124 may be used to let a caregiver use the device 100 even if its battery charge level is low.

Figure 2:
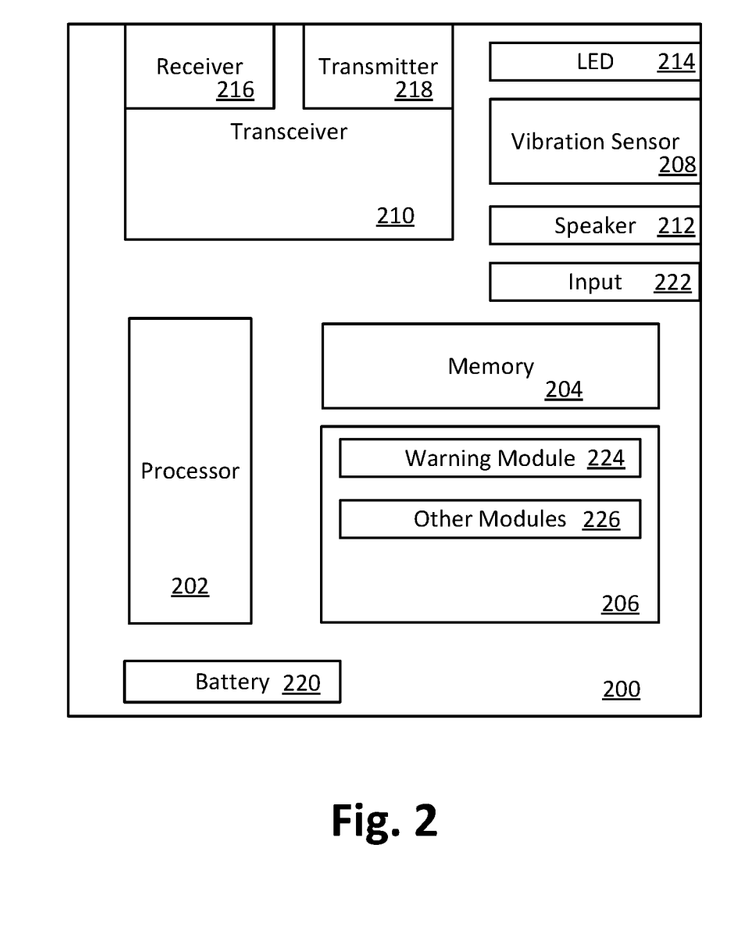
FIG. 2 is a block diagram of a vehicular warning device, in accordance with various embodiments.

Referring now to FIG. 2, a vehicular warning device 200, such as the portable warning device 140 for example, may include a number of components 202-226, including a processor 202, a memory 204, an execution environment 206, a vibration sensor 208, and a transceiver 210 that may be coupled together and configured to cooperate with each other to present a warning to a caregiver based at least in part on an alert signal received at the vehicular warning device 200 in accordance with various embodiments. The vibration sensor 208 may include an accelerometer or gyroscope in various embodiments. The device 200 may include an audio and/or visual output such as a speaker 212 and an LED 214 in various embodiments. The transceiver 210 may include a receiver 216 and a transmitter 218 in various embodiments. The transceiver 210 may be a low power Bluetooth radio-frequency device, for example. In some embodiments, the device 200 may include only the receiver 216 rather than having a transceiver that includes both receiving and transmitting components. A battery 220 may be used to power the device 200 and an input mechanism 222 may provide for on/off and/or volume control in various embodiments. The execution environment 206 may include a warning module 224 operated by the processor 202 to activate an output device such as the LED 214 and/or the speaker 212 based at least in part on a wireless alert signal received at the wireless receiver 216 from a child car seat such as the device 100 described with respect to FIG. 1, that indicates the child car seat is in use. In embodiments, the warning module 224, operated by the processor 202, may activate an output device based at least in part on the wireless alert signal and a signal from the vibration sensor 208. The execution environment 206 may also include other modules 226 and/or storage in various embodiments. The execution environment 206 may also include an OS operated by the processor 202. In embodiments, the OS may be an embedded computing OS. The vehicular warning device 200 may be a portable device that is selectively locatable in multiple vehicles in various embodiments.

Figure 3:
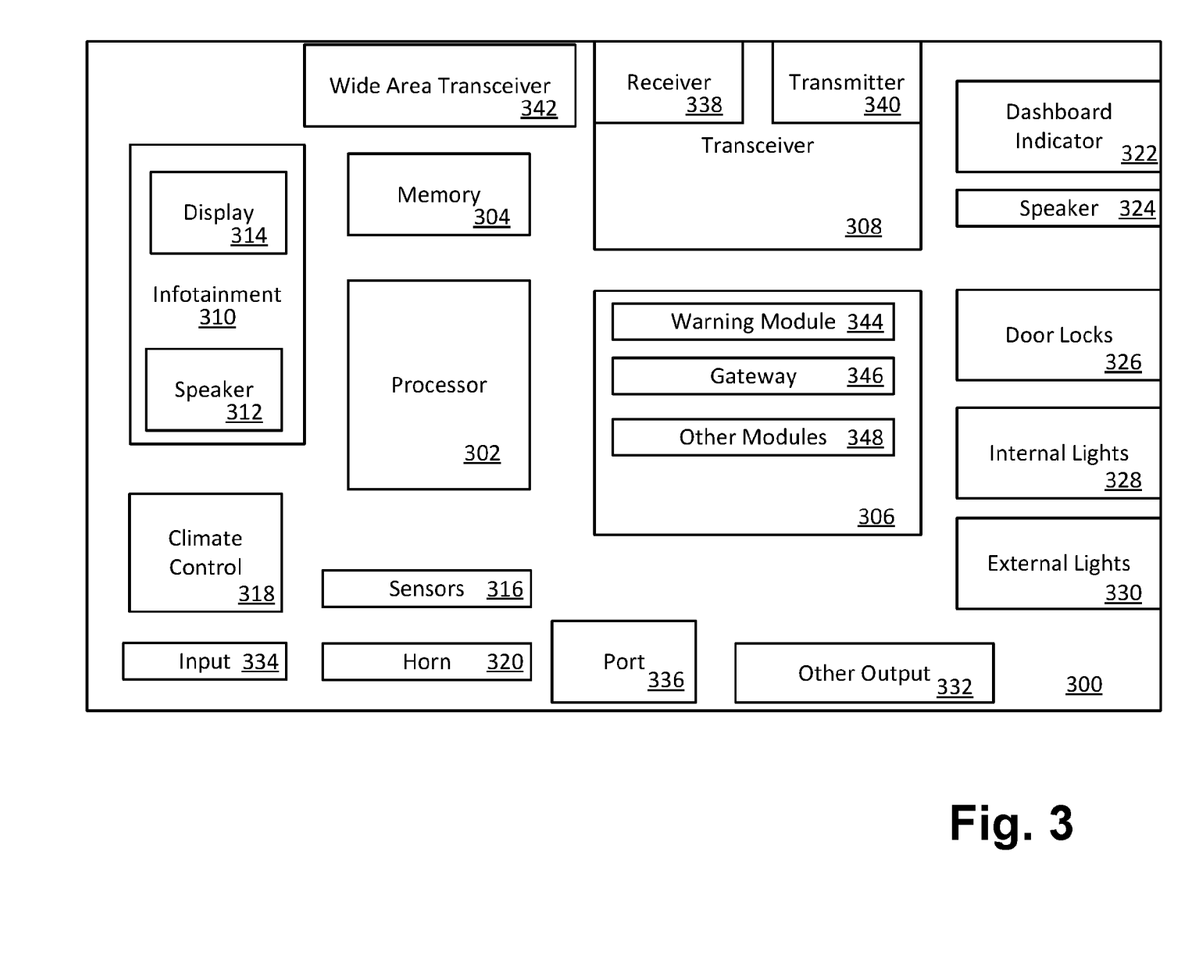
FIG. 3 is a block diagram of a vehicle control system, in accordance with various embodiments.

Referring now to FIG. 3, a block diagram of a vehicle control system 300, such as the vehicle control system 142 for example, is shown in accordance with various embodiments. As shown, the vehicle control system 300 may include a number of components 302-350, including a processor 302, a memory 304, an execution environment 306, and a transceiver 308, as well as sensors and output devices that may be coupled together and configured to cooperate with each other to respond in an escalating fashion to alert signals received from a car seat such as the device 100 described with respect to FIG. 1, in accordance with various embodiments. The system 300 may include an infotainment system 310 having a speaker 312 and a display 314 that may be a touch-sensitive display that may also function as an input device, in various embodiments. The system 300 may include sensors 316 that may include sensors for internal temperature, external temperature, whether the vehicle is turned off, whether the vehicle is in 'park', and whether a front driver seat or a front passenger seat is currently occupied, for example. Others sensors 316 may also be included in various embodiments.

The system 300 may include the ability to control various vehicle devices and systems such as a climate control system 318, a vehicle horn 320, a dashboard indicator 322, a speaker 324, door locks 326, vehicle internal lights 328, vehicle external lights 330, such as headlights or taillights for example, and/or other output devices 332. The system 300 may include one or more input devices 334 and a port 336. The transceiver 308 may include a receiver 338 and a transmitter 340 in various embodiments. In embodiments, the transceiver 308 may be a low power Bluetooth radio-frequency device, for example. The system 300 may include a wide area transceiver 342 that may be used to place cellular telephone voice and/or data calls in embodiments. The system 300 may also include other communications devices such as WiFi transceivers in embodiments. The execution environment 306 may include a warning module 344 operated by the processor 302 to activate an output device and/or a control system based at least in part on a wireless alert signal received at the wireless receiver 338 from a child car seat such as the device 100 described with respect to FIG. 1, that indicates the child car seat is in use. In embodiments, the warning module 344, operated by the processor 302, may determine a vehicle status based at least in part on data from one or more of the vehicle sensors 316 and activate an output device or control system with an elevated alert signal based at least in part on the vehicle status. The output device or control system activated by the warning module 344 may include the vehicle horn 320, the infotainment system 310, the climate control system 318, the internal lights 328, the external lights 330, the door locks 326, the dashboard indicator 322, or other devices in various embodiments. The execution environment 306 may also include a gateway 346, other modules 348, storage, and/or an OS operated by the processor 302 in various embodiments.

Referring also to FIGS. 1-2, in various embodiments, the device 100 of FIG. 1 may communicate unidirectionally in a basic mode, bidirectionally in an advanced mode, or in a combination of unidirectional and bidirectional modes depending on the ability of a portable receiver device or vehicle control system to interact with the device 100. For example, the device 100 may communicate in a unidirectional manner with a simplified version of the vehicular warning device 200 that has only the receiver 216 but not the transmitter 218. The advanced mode may be able to function with vehicles having electronic control systems with a gateway function such as that provided by the gateway 346 that allows communication with external devices, and/or allows control logic that may be in the form of an application program to be loaded into the system. This may be performed by loading an application in the form of the warning module 344 into the system 300 wirelessly using the transceiver 308 or the transceiver 342, or by using a wired connection via the port 336, for example. However, the device 100 may still use a basic, unidirectional interaction mode when communicating with vehicles having advanced control systems capable of bidirectional communication in some embodiments. In embodiments, the device 100 may establish an ad-hoc network link with the vehicle control system 300 and store a device identifier associated with the vehicle control system 300 such that if the device 100 loses connectivity with the vehicle control system 300, when the device 100 attempts to reestablish a connection, even if in a crowded environment with many other vehicles nearby, the device 100 will reestablish a network link with the vehicle corresponding to the stored device identifier.

In the basic, unidirectional interaction mode, the device 100 may send a periodic stream of pings until the device 100 disengages (e.g., infant is extracted from baby-seat or baby-seat is extracted from vehicle). The pings may be referred to as a heartbeat signal for the device 100 in various embodiments. The pings may be a periodically broadcast stream of digital data that may include a device type, device identifier, and/or alert level. The pings may include different, more or less data in various embodiments. When the device 100 disengages, the stream of pings may simply stop, or alternatively, a deactivation signal may be broadcast for a predetermined period of time such as approximately two seconds in various embodiments.

Generally, the pings may be received by a receiving device or listener such as the vehicular warning device 200 or the vehicle control system 300. Receiving devices may include but are not limited to an independent dashboard reminder, an integrated dashboard reminder, a smartphone or wearable reminder such as the personal communications device 144, for example, a device with a vibration sensor, devices associated with emergency services providers, or a door lock control device, for example. In embodiments, the independent dashboard reminder may be a portable vehicular warning device such as the device 200 that includes the LED 214 that can be mounted at eye level or near the dashboard to act like an extension of a vehicle's dashboard indicator system. In embodiments, this may be a very basic receiver with an LED and a bell used to provide a soft chime and an eye-level, non-intrusive reminder that a baby is on board. In this manner, the caregiver is kept aware of the baby on board status visually and through an ambient intrusive soft beep that persists even when the car engine (and radio, etc.) are turned off. This type of receiver could be retrofitted into any vehicle or moved between multiple vehicles in various embodiments. In some embodiments, the warning device may include a vibration sensor, such as the vibration sensor 208. In embodiments, the warning device may raise a higher level of alarm if more than 60 seconds have gone by, the vehicle is detected as non-vibrating, and a device 100 deactivated signal has not been received.

In embodiments, an integrated dashboard reminder such as the dashboard indicator 322 may be used. The alert signal from the device 100 may be picked up by the transceiver 308, with a corresponding indicator displayed using the dashboard indicator 322 and/or one or more sounds being played using the speaker 324. In embodiments, output may be directed to the infotainment system 310 to display an indicator on the display 314 and/or provide audio output using the speaker 312.

In embodiments, the device 100 may send a notification to a caregiver's personal mobile device such as the personal communications device 144 (e.g., a Bluetooth enabled smartphone or smart watch), for example. In other embodiments, the notification may be sent by the vehicle control system 300 based at least in part on an alert signal from the device 100. In embodiments, the alert module 134, operated by the processor 102, may establish an ad-hoc network link with a personal communication device such as the caregiver's personal mobile device and cause the wireless transmitter 118 to wirelessly transmit an alert signal to the personal communication device over the established ad-hoc network link. The device 100 may send the notification once per activation, every 'N' minutes, with the reminder stream being captured by the personal mobile device and being displayed with other active notifications that may be displayed by the personal mobile device itself. In embodiments, the period 'N' may be set by the caregiver, but would not be able to fall below at least once per activation and at least once every 30 minutes. The personal mobile device may also be equipped with logic that provides enhanced options that may be based at least in part on the notification sent by the device 100. For example, if the personal mobile device is not in an auto-stream-mode, then upon any notification in a stream of notifications from the device 100, the personal mobile device will go into an auto-stream-mode and remain in that mode until a caregiver resets the mode. In embodiments, the personal mobile device will issue a soft chime or vibrate periodically, such as once per minute, while in auto-stream-mode. If the caregiver resets the mode of the personal mobile device, then a timer may be set for execution 'T' minutes later, with 'T' being configurable but not to exceed a predetermined maximum, such as 10 minutes, in various embodiments. During the time 'T', if another ping from the device 100 is received, then the personal mobile device may restart the auto-stream-mode. In embodiments, if the personal mobile device is in auto-stream-mode and a device disengaged ping is received from the device 100 (e.g., infant has been extracted from the car or the infant seat), then automatically terminate the auto-stream-mode.

In embodiments, a receiver may repeat the alert signal received from the device 100 or send another signal that may be received by a secondary receiver located in a place such as an office, mass transit point, or shopping mall that may then transmit an SOS message to an emergency services provider or a security post. A receiver may also be coupled with a door lock actuator in some embodiments such that so long as the device 100 continues to transmit an alert signal, the vehicle doors are either prevented from being locked from the outside, or an audible reminder about the baby in the car seat is generated at the time the device 100 is transmitting its alert signals when the caregiver locks the car either from inside or outside (but does not prevent the locking).

In embodiments, the device 100 may communicate in a bidirectional manner with receiver devices such as the vehicle control system 300, when possible. The device 100 may be able to then monitor, in conjunction with vehicle electronics and control, whether a door is open/closed or locked/unlocked, whether a key is in the ignition, whether the vehicle is running, etc. Accordingly, the device 100 may be able to implement an escalating series of soft, louder, and loudest alerts/alarms, inside or outside of the vehicle. The device 100 may also be able to take into consideration whether a vehicle's climate control systems are active or not, and issue a more urgent alarm if they are not, for example. In embodiments, the vehicle may send a signal back to the device 100 that may convey information about a state of the vehicle such as whether the ignition is turned on, whether the doors are locked, etc. In embodiments, this signal may include a vehicle status indicator. An escalating series of soft warnings and loud alarms may be triggered in a variety of ways in various embodiments. For example, if a device 100 is occupied but the vehicle is turned off, a mild warning may be issues as soon as the vehicle is turned off, inside the vehicle only. If the device 100 is occupied, the vehicle is turned off, and the driver seat is unoccupied, a stronger warning may be issued, inside the vehicle. If the device 100 is occupied, the vehicle is turned off, neither of the front seats are occupied, and all vehicle doors have been closed for at least 20 seconds, a very strong warning may be sounded that is audible outside the vehicle, such as a single beep of the horn repeated every ten seconds, for example. If the device 100 is occupied, the car is turned off, neither of the front seats are occupied, and the car doors are locked, vigorous warnings may be issued as soon as the doors lock.

In embodiments, the device 100 may continue to transmit to the vehicle control system 300 even after a caregiver has left the vehicle, if a child is still on board in the device 100. The system 300 may sound the car horn periodically, and may turn on heat or air conditioning in the vehicle if the temperature is outside of a safe level. If the vehicle is hot inside, the system 300 may roll down the windows sufficiently to allow internal temperature in the vehicle to equalize with external temperature. If the vehicle has a built-in GPS or other location determining system and has wide area paging or calling capabilities, the system 300 may broadcast an alert, along with location information such as GPS coordinates to a set of pre-programmed emergency numbers, including emergency services providers such as by dialing 911 if the vehicle is in the United States or other relevant numbers in other locations, so long as the device 100 and the system 300 detect that there is a baby on board, the vehicle engine is turned off, the doors are shut, or other determining factors.

Figure 4:
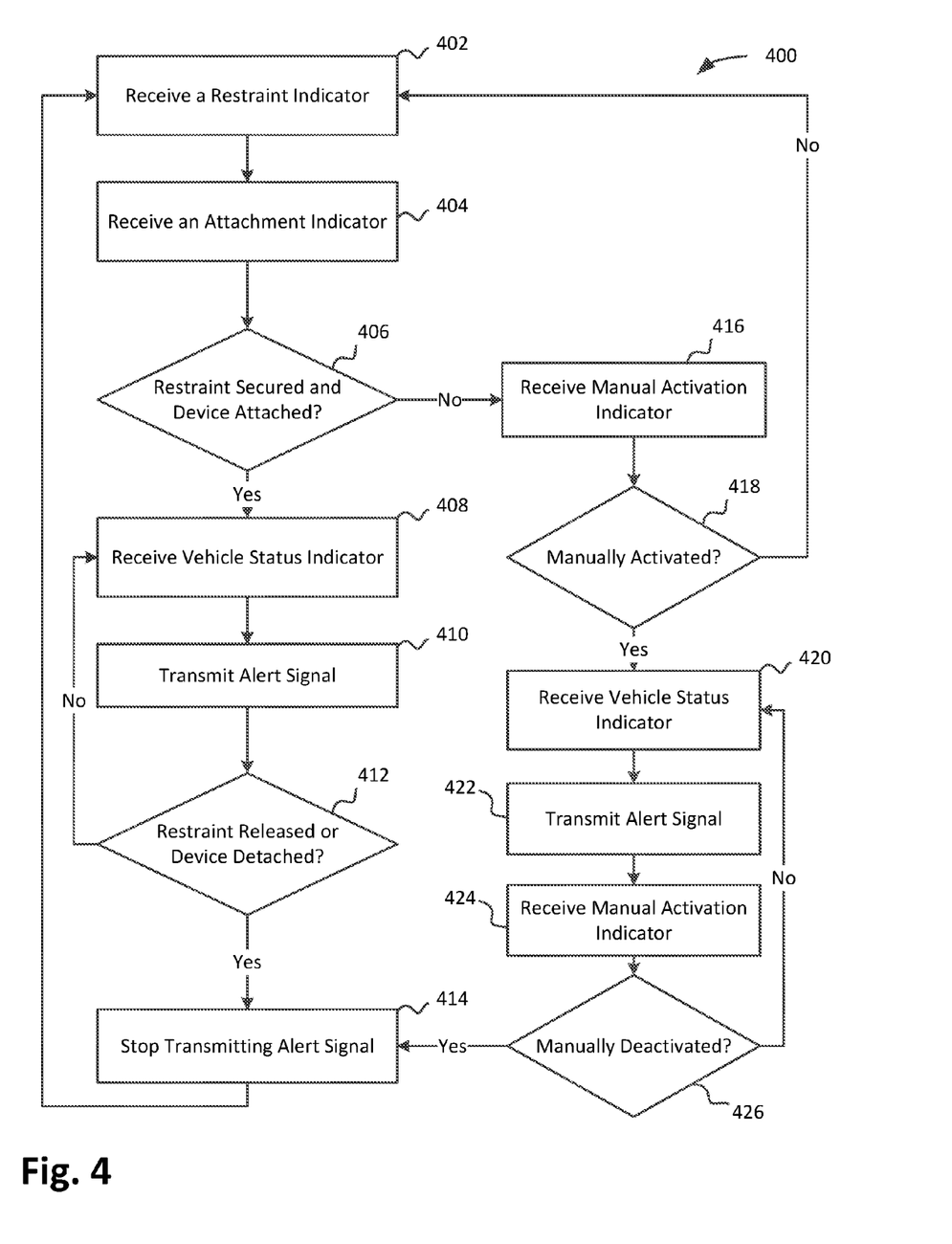
FIG. 4 is a flow diagram of an example process that may be implemented on various computing devices described herein, in accordance with various embodiments.

FIG. 4 depicts an example process 400 for transmitting an alert signal that may be implemented by the device 100 in accordance with various embodiments. In various embodiments, the process 400 may be performed by the alert module 134, restraint sensor 108, attachment sensor 110, and/or transceiver 112. In other embodiments, the process 400 may be performed with more or less modules and/or with some operations in different order. As shown, for the embodiments, the process 400 may start at a block 402 where a restraint indicator may be received. This may occur by the processor 102 operating the alert module 134 and receiving a restraint indicator from the restraint sensor 108 based at least in part on whether the restraint 114 is securely in place such as by buckling a five point safety harness to securely fasten a child or infant in the device 100, for example. At operation 404, an attachment indicator may be received. This may occur by the processor 102 operating the alert module 134 and receiving an attachment indicator from the attachment sensor 110 based at least in part on whether the securing component 116 is engaged to securely attach the device 100 to a vehicle, for example. At a decision block 406, it may be determined whether the restraint 114 is secured and the device 100 is attached to a vehicle. This may be performed by the processor 102 operating the alert module 134 based at least in part on the restraint indicator and the attachment indicator, for example.

If the restraint 114 is secured and the device 100 is attached to a vehicle, a vehicle status indicator may be received at a block 408. At operation 410, an alert signal may be transmitted based at least in part on the vehicle status indicator. In embodiments, the alert signal may indicate a standard alert status, or varying levels of an escalated alert status based at least in part on the vehicle status indicator. If the device 100 is engaged in unidirectional rather than bidirectional communication with a receiver or listening device, the process 400 may proceed from the decision block 406 directly to the operation 410 where the alert signal may be transmitted, but may not be based at least in part on a vehicle status indicator. The alert signal may be transmitted by the processor 102 operating the alert module 134 to transmit with the transmitter 118, for example. At decision block 412, it may be determined whether the restraint 114 has been released or the device 100 has been detached from the vehicle. If neither has occurred, the process may return to the block 408 if the device 100 is engaged in bidirectional communication. If the device is engaged in unidirectional communication, the process may return to the block 410. The process path for unidirectional communication is not shown in FIG. 4. If, at the decision block 412, it is determined the restraint 114 has been released or the device 100 has been detached from the vehicle, the device 100 may stop transmitting the alert signal at operation 414. In embodiments, a deactivation signal may also be transmitted at operation 414. The process 400 may then return to the block 402 in various embodiments.

If, at the decision block 406, it was not determined that the restraint 114 is secured and the device 100 is attached to a vehicle, the process 40 may proceed to a block 416 where a manual activation indictor may be received. The manual activation indicator may be received by the processor 102 operating the alert module 134 based at least in part on an activation state of the input mechanism 126, for example. At a decision block 418, it may be determined whether the device 100 has been manually activated based at least in part on the manual activation indicator. If it is determined that the device 100 has not been manually activated, the process 400 may return to the block 402. If it is determined that the device 100 has been manually activated at the decision block 418, a vehicle status indicator may be received at operation 420. At operation 422, an alert signal may be transmitted based at least in part on the vehicle status indicator. If the device 100 is engaged in unidirectional rather than bidirectional communication with a receiver or listening device, the process 400 may proceed from the decision block 418 directly to the operation 422 where the alert signal may be transmitted, but may not be based at least in part on a vehicle status indicator. At a block 424, a manual activation indicator may be received. The manual activation indicator may be based at least in part on an activation state of the input mechanism 126. At a decision block 426, it may be determined whether the device 100 has been manually deactivated based at least in part on the manual activation indicator received at the block 424. If it is determined the device 100 has been manually deactivated, the process 400 may proceed to operation 414 where the device 100 may stop transmitting the alert signal and may transmit a deactivation signal in various embodiments. If, at the decision block 426, it is not determined that the device 100 has been manually deactivated, the process 400 may return to the block 420 where a vehicle status indicator is received if the device 100 is engaged in bidirectional communication. If the device 100 is engaged in unidirectional communication, the process 400 may return to the block 422 rather than the block 420.

Figure 5:
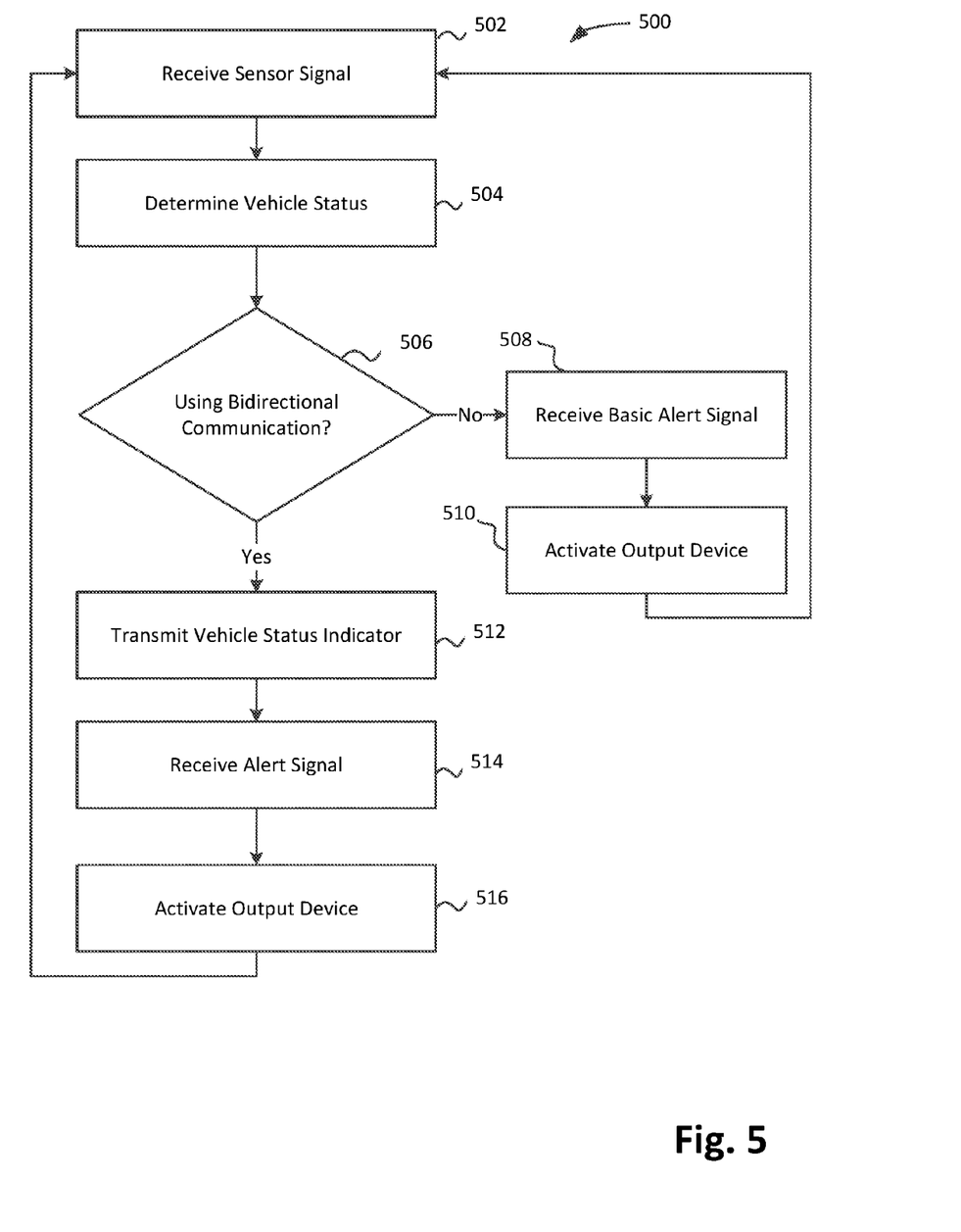
FIG. 5 is a flow diagram of an example process that may be implemented on various computing devices described herein, in accordance with various embodiments.

FIG. 5 depicts an example process 500 for alerting a caregiver that a child may be present in a vehicle, by the vehicular warning device 200 or vehicle control system 300 in accordance with various embodiments. The process 500 may be performed by e.g., earlier described warning module 224 or 344, processor 202 or 302, vibration sensor 208, sensors 316, and various output devices 212, 214, 310-314, 318-332, for example. In alternate embodiments, the process 500 may be performed by more or less modules or components, and/or in different order. At operation 502, a sensor signal may be received. This may be a signal from the vibration sensor 208 received at the processor 202 or a signal from one or more sensors 316 received at the processor 302, for example. At a block 504, a vehicle status is determined based at least in part on the sensor signal received. In embodiments, for warning devices not having a capability to do so, such as a warning device similar to the vehicular warning device 200 but lacking the vibration sensor 208, a vehicle status may not be determined. At a decision block 506, it may be determined whether bidirectional communication is being used to communicate with a device such at the device 100. If bidirectional communication is not being used, a basic alert signal may be received at operation 508. The warning module 224 operating on the processor 202 may receive the basic alert signal from the device 100 via the receiver 216 indicating that a child or infant is restrained in the device 100 and the device 100 is attached to a vehicle, for example. Similarly, the warning module 344 operated by the processor 302 may receive the basic alert signal from the device 100 via the receiver 338. At a block 510, an output device, such as the speaker 214, the LED 214, the infotainment system 310, the climate control system 318, the dashboard indicator 322, the speaker 324, the door locks 326, the internal lights 328, the external lights 330, or other output 332 may be activated based at least in part on the basic alert signal received and the vehicle status determined. For example, the vehicular warning device 200 may activate a standard level output when the vibration sensor 208 indicates the vehicle is running and activate an elevated level output when the vibration sensor 208 indicates the vehicle has stopped running some time ago such as one minute, for example, to give a caregiver time to deactivate the device 100 such as by removing a child from a car seat. In other embodiments, the elevated level may start after a different time period or immediately after the vehicle is detected to stop running and a child or infant is still indicated as being restrained in the vehicle by the basic alert signal. The warning module 344 may also determine that an emergency services provider should be notified and send a message using the wide area transceiver 342, for example. For warning devices not having a capability to determine a vehicle status, the output device may not be activated based at least in part on a vehicle status. The process 500 may then return to the operation 502.

If, at the decision block 506, it was determined that bidirectional communication is being used, a vehicle status indicator, based at least in part on the vehicle status determined at operation 504, may be transmitted at operation 512. At operation 514 an alert signal may be received from a restraining device such as the device 100. The alert signal may include informational content that indicates an elevated alert status is warranted in various embodiments. The warning module 224 or 344 may activate one or more output devices at operation 516 based at least in part on the alert signal. In some embodiments, for vehicles that support such control, the alert signal may more directly activate one or more output devices using gateway 346, for example. In similar fashion, in some embodiments, information from sensors 316 may be provided more directly to the device 100 through the gateway 346 by receiving a request from the device 100 for vehicles that support such requests. The process 500 may then return to operation 502. In embodiments, the alert module 134 of the device 100 may include a vehicle type selection module that may allow a caregiver to select a vehicle type (e.g., make, model, year) to allow for differing communications protocols over the gateway 346 and to make use of the supported unidirectional and/or bidirectional communication ability of the vehicle. In embodiments, the alert module 134 may include an automatic vehicle type selection module that may automatically select an appropriate vehicle type based at least in part on an attempt to establish a wireless connection with the vehicle.

Figure 6:
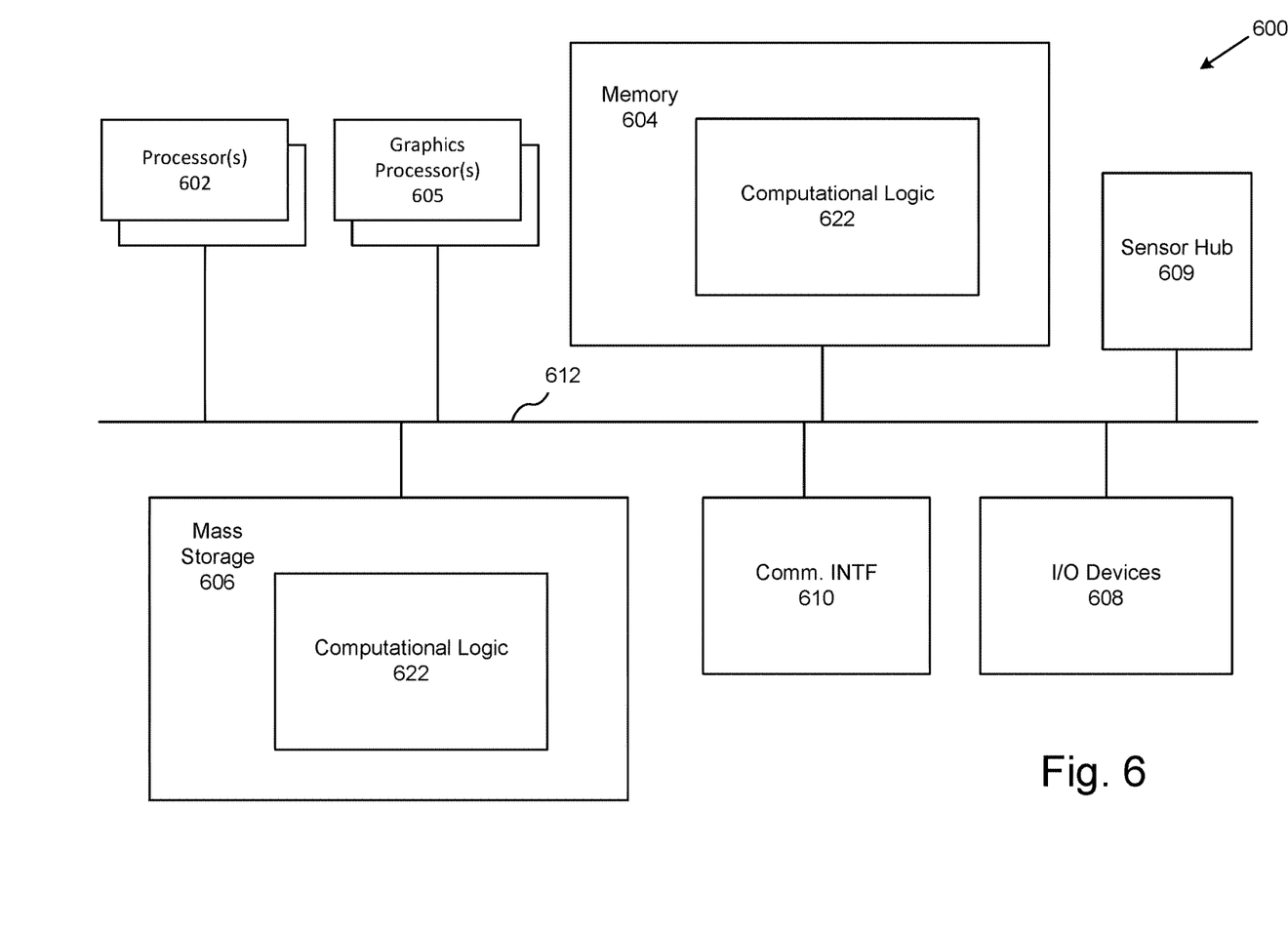
FIG. 6 illustrates an example computing environment suitable for practicing various aspects of the disclosure, in accordance with various embodiments.

Referring now to FIG. 6, an example computer 600 suitable to practice the present disclosure as earlier described with reference to FIGS. 1-3 is illustrated in accordance with various embodiments. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include one or more graphics processors 605, mass storage devices 606 (such as diskette, hard drive, compact disc read only memory (CD-ROM) and so forth), input/output devices 608 (such as display, keyboard, cursor control, remote control, gaming controller, image capture device, and so forth), sensor hub 609, and communication interfaces 610 (such as network interface cards, modems, infrared receivers, radio receivers (e.g., Bluetooth), and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with the device 100, the vehicular warning device 200, the vehicle control system 300, or personal communications devices e.g., operations described for modules 134, 136, 224, 226, 344, and 348, shown in FIG. 1-3, operations shown in process 400 of FIG. 4 or process 500 of FIG. 5, or operations associated with alerts received by a personal communications device (such as functionality described with respect to auto-stream-mode, for example), collectively denoted as computational logic 622. The system memory 604 and mass storage devices 606 may also be employed to store a working copy and a permanent copy of the programming instructions implementing the operations associated with an OS running on the device 100, the vehicular warning device 200 or the vehicular control system 300. The system memory 604 and mass storage devices 606 may also be employed to store the data or local resources in various embodiments. The various elements may be implemented by assembler instructions supported by processor(s) 602 or high-level languages, such as, for example, C, that can be compiled into such instructions.

The permanent copy of the programming instructions may be placed into mass storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 608-612 may vary, depending on whether computer 600 is a stationary computing device, such as a set-top box or desktop computer, a mobile computing device such as a tablet computing device, laptop computer or smartphone, or an embedded computing device. Their constitutions are otherwise known, and accordingly will not be further described. In various embodiments, different elements or a subset of the elements shown in FIG. 6 may be used. For example, some devices may not include the graphics processor 605, may use a unified memory that serves as both memory and storage, or may couple sensors without using a sensor hub.

Figure 7:
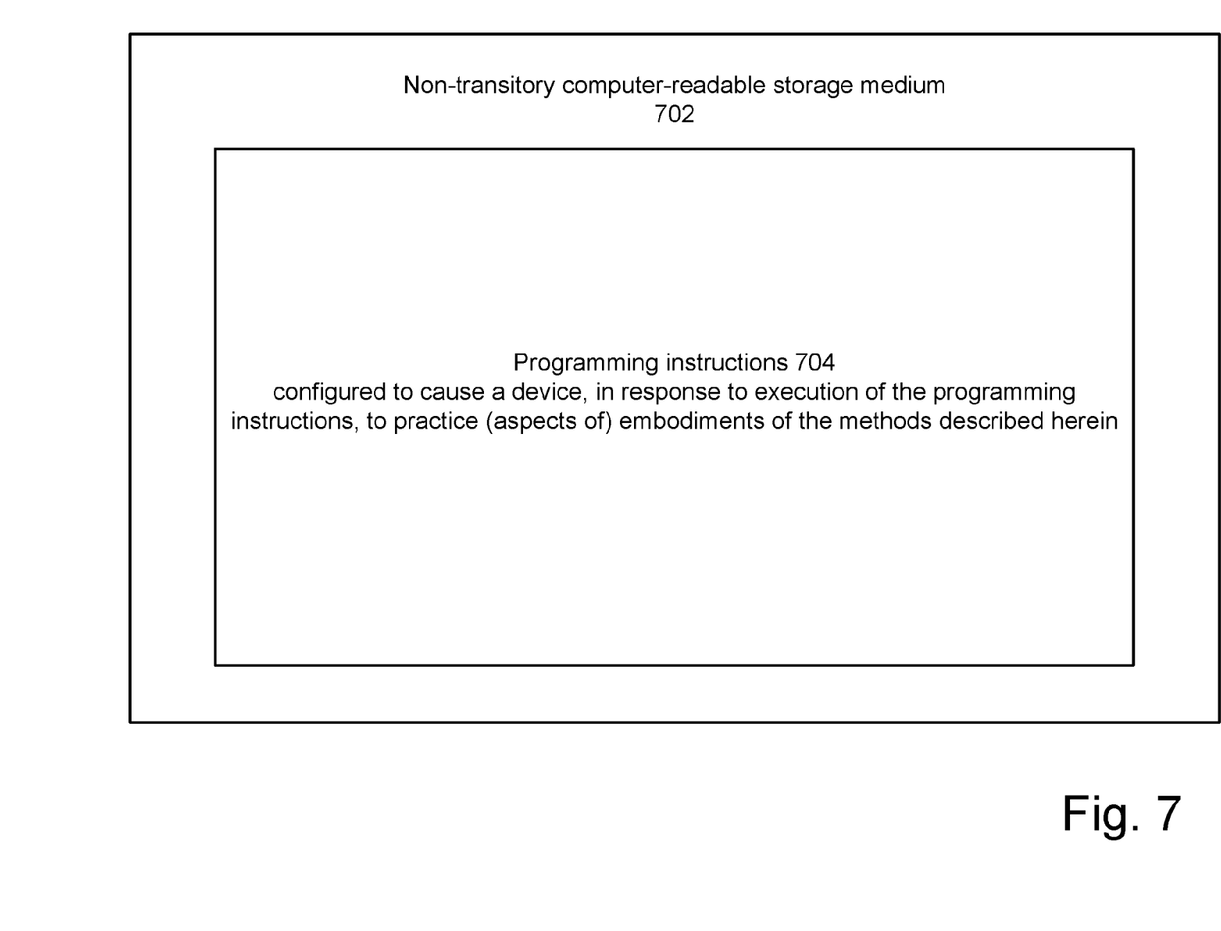
FIG. 7 illustrates an example storage medium with instructions configured to enable an apparatus to practice various aspects of the present disclosure, in accordance with various embodiments.

FIG. 7 illustrates an example at least one non-transitory computer-readable storage medium 702 having instructions configured to practice all or selected ones of the operations associated with the device 100, the vehicular warning device 200 or the vehicle control system 300, earlier described, in accordance with various embodiments. As illustrated, at least one non-transitory computer-readable storage medium 702 may include a number of programming instructions 704. The storage medium 702 may represent a broad range of persistent storage medium known in the art, including but not limited to flash memory, dynamic random access memory, static random access memory, an optical disk, a magnetic disk, etc. Programming instructions 704 may be configured to enable a device, e.g., computer 600, device 100, vehicular warning device 200, vehicle control system 300, or a personal communications device in response to execution of the programming instructions, to perform, e.g., but not limited to, various operations described for modules 134, 136, 224, 226, 344, and 348 shown in FIG. 1-3, operations of process 400 of FIG. 4 or process 500 of FIG. 5, or operations associated with alerts received by a personal communications device (such as functionality described with respect to auto-stream-mode, for example). In alternate embodiments, programming instructions 704 may be disposed on multiple computer-readable storage media 702. In alternate embodiment, storage medium 702 may be transitory, e.g., signals encoded with programming instructions 704.

Referring back to FIG. 6, for an embodiment, at least one of processors 602 may be packaged together with memory having computational logic 622 configured to practice aspects described for modules 134, 136, 224, 226, 344, and 348 shown in FIG. 1-3, operations of process 400 of FIG. 4 or process 500 of FIG. 5, or operations associated with alerts received by a personal communications device (such as functionality described with respect to auto-stream-mode, for example). For an embodiment, at least one of processors 602 may be packaged together with memory having computational logic 622 configured to practice aspects described for modules 134, 136, 224, 226, 344, and 348 shown in FIG. 1-3, operations of process 400 of FIG. 4 or process 500 of FIG. 5, or operations associated with alerts received by a personal communications device (such as functionality described with respect to auto-stream-mode, for example) to form a System in Package (SiP). For an embodiment, at least one of processors 602 may be integrated on the same die with memory having computational logic 622 configured to practice aspects described for modules 134, 136, 224, 226, 344, and 348 shown in FIG. 1-3, operations of process 400 of FIG. 4 or process 500 of FIG. 5, or operations associated with alerts received by a personal communications device (such as functionality described with respect to auto-stream-mode, for example). For an embodiment, at least one of processors 602 may be packaged together with memory having computational logic 622 configured to practice aspects of modules 134, 136, 224, 226, 344, and 348 shown in FIG. 1-3, process 400 of FIG. 4 or process 500 of FIG. 5, or operations associated with alerts received by a personal communications device (such as functionality described with respect to auto-stream-mode, for example) to form a System on Chip (SoC). For at least one embodiment, the SoC may be utilized in, e.g., but not limited to, a mobile computing device such as a wearable device and/or a smartphone.

Machine-readable media (including non-transitory machine-readable media, such as machine-readable storage media), methods, systems and devices for performing the above-described techniques are illustrative examples of embodiments disclosed herein. Additionally, other devices in the above-described interactions may be configured to perform various disclosed techniques.

EXAMPLES

Example 1 may include a restraint apparatus with alert, comprising: one or more processors; a wireless transmitter coupled with the one or more processors; a restraint; a securing component; a first sensor coupled with the restraint and the one or more processors to provide a restraint indicator based at least in part on whether the restraint is in a restraining position; a second sensor coupled with the securing component and the one or more processors to provide an attachment indicator based at least in part on whether the securing component is engaged to couple the apparatus to a vehicle; and an alert module operated by the one or more processors to cause the wireless transmitter to wirelessly transmit an alert signal based at least in part on the restraint indicator and the attachment indicator.

Example 2 may include the subject matter of Example 1, wherein the alert module is operated to wirelessly transmit the alert signal when the restraint indicator indicates the restraint is in a restraining position and the attachment indicator indicates the securing component is engaged to couple the apparatus to the vehicle, and wherein the alert module is operated to stop wirelessly transmitting the alert signal when at least one of the restraint indicator indicates the restraint is not in a restraining position or the attachment indicator indicates the securing component is not engaged to couple the apparatus to the vehicle.

Example 3 may include the subject matter of any one of Examples 1-2, further comprising a manual activation component, wherein the alert module is to cause the wireless transmitter to wirelessly transmit an alert signal based at least in part on an activation state of the manual activation component.

Example 4 may include the subject matter of any one of Examples 1-3, further comprising a wireless receiver coupled with the one or more processors, wherein the alert module is to cause the wireless transmitter to wirelessly transmit an alert signal indicating an escalated alert status based at least in part on a signal received by the wireless receiver indicating a vehicle status of the vehicle.

Example 5 may include the subject matter of any one of Examples 1-4, wherein the alert module is to establish an ad-hoc network link with a personal communication device and cause the wireless transmitter to wirelessly transmit the alert signal to the personal communication device over the established ad-hoc network link.

Example 6 may include a computer implemented restraint method with alert, comprising: receiving a restraint indicator at a computing device, the restraint indicator being sent based at least in part on whether a restraint is in a restraining position; receiving an attachment indicator at the computing device, the attachment indicator being sent based at least in part on whether a securing component is engaged to couple an apparatus having the restraint and the securing component to a vehicle; and transmitting or causing to be transmitted, by the computing device, an alert signal based at least in part on the restraint indicator and the attachment indicator.

Example 7 may include the subject matter of Example 6, wherein causing comprises causing, by the computing device, a wireless transmitter to transmit an alert signal when the restraint indicator indicates a restraint is in a restraining position and the attachment indicator indicates a securing component is engaged to couple a car seat with the vehicle, wherein the method further comprises causing, by the computing device, the wireless transmitter to stop wirelessly transmitting the alert signal when at least one of the restraint indicator indicates the restraint is not in a restraining position or the attachment indicator indicates the securing component is not engaged to couple the car seat with the vehicle.

Example 8 may include the subject matter of any one of Examples 6-7, further comprising determining, by the computing device, an activation state of a manual activation component, wherein causing comprises causing, by the computing device, a wireless transmitter to transmit the alert signal based at least in part on the activation state of the manual activation component.

Example 9 may include the subject matter of any one of Examples 6-8, further comprising receiving, by the computing device, a vehicle status indicator indicating a vehicle status of the vehicle, wherein causing comprises causing, by the computing device, a wireless transmitter to transmit an elevated alert signal based at least in part on the vehicle status indicator.

Example 10 may include the subject matter of any one of Examples 6-9, further comprising establishing, by the computing device, an ad-hoc network link with a personal communication device, wherein causing comprises causing, by the computing device, a wireless transmitter to transmit the alert signal to the personal communication device over the established ad-hoc network link.

Example 11 may include at least one non-transitory computer-readable medium comprising instructions stored thereon that, in response to execution of the instructions by a computing device, cause the computing device to: receive a restraint indicator that was sent based at least in part on whether a restraint is in a restraining position; receive an attachment indicator that was sent based at least in part on whether a securing component is engaged to couple an apparatus having the restraint and the securing component to a vehicle; and transmit or cause to be transmitted an alert signal based at least in part on the restraint indicator and the attachment indicator.

Example 12 may include the subject matter of Example 11, wherein causing comprises causing, by the computing device, a wireless transmitter to transmit an alert signal when the restraint indicator indicates a restraint is in a restraining position and the attachment indicator indicates a securing component is engaged to couple a car seat with the vehicle, wherein the instructions further cause the computing device to cause the wireless transmitter to stop wirelessly transmitting the alert signal when at least one of the restraint indicator indicates the restraint is not in a restraining position or the attachment indicator indicates the securing component is not engaged to couple the car seat with the vehicle.

Example 13 may include the subject matter of any one of Examples 11-12, wherein the computing device is further caused to determine an activation state of a manual activation component, wherein the computing device is to cause a wireless transmitter to transmit the alert signal based at least in part on the activation state of the manual activation component.

Example 14 may include the subject matter of any one of Examples 11-13, wherein the computing device is further caused to receive a vehicle status indicator indicating a vehicle status of the vehicle, wherein the computing device is to cause a wireless transmitter to transmit an elevated alert signal based at least in part on the vehicle status indicator.

Example 15 may include the subject matter of any one of Examples 11-14, wherein the computing device is further caused to establish an ad-hoc network link with a personal communication device, wherein the computing device is to cause a wireless transmitter to transmit the alert signal to the personal communication device over the established ad-hoc network link.

Example 16 may include a vehicular warning apparatus comprising: one or more processors; a wireless receiver coupled with the one or more processors; an output device; and a warning module operated by the one or more processors to activate the output device based at least in part on a wireless alert signal received at the wireless receiver from a child car seat in a vehicle that indicates the child car seat is in use.

Example 17 may include the subject matter of Example 16, further comprising a vibration sensor coupled with the one or more processors, wherein the warning module is to activate the output device based at least in part on the wireless alert signal and a signal from the vibration sensor.

Example 18 may include the subject matter of any one of Examples 16-17, wherein the apparatus is a portable device, selectively locatable in a first vehicle or a second vehicle.

Example 19 may include the subject matter of any one of Examples 16-18, further comprising one or more vehicle sensors coupled with the one or more processors, wherein the warning module is to determine a vehicle status based at least in part on data from one or more of the one or more vehicle sensors and activate the output device with an elevated alert signal based at least in part on the vehicle status.

Example 20 may include the subject matter of any one of Examples 16-19, wherein the output device includes at least one of a vehicle horn, a vehicle infotainment system, a vehicle climate control system, a vehicle light, a vehicle door locking mechanism, or a vehicle dashboard indicator.

Example 21 may include a computer implemented restraint method with alert, comprising: receiving, by a computing device, an alert signal from a restraining device in a vehicle that indicates the restraining device is in use; and activating, by the computing device, a warning output based at least in part on the alert signal.

Example 22 may include the subject matter of Example 21, further comprising: sending, by the computing device, a vehicle status signal to the restraining device; receiving, by the computing device, an elevated alert signal from the restraining device; and activating, by the computing device, an elevated warning output based at least in part on the elevated alert signal.

Example 23 may include the subject matter of any one of Examples 21-22, further comprising: activating, by the computing device, an elevated warning output based at least in part on a vehicle status.

Example 24 may include the subject matter of Example 23, wherein activating the elevated warning output includes transmitting an emergency signal including location information to an emergency services provider.

Example 25 may include the subject matter of any one of Examples 21-24, wherein activating, by the computing device, the warning output includes activating at least one of a vehicle horn, a vehicle infotainment system, a vehicle climate control system, a vehicle light, a vehicle door locking mechanism, or a vehicle dashboard indicator.

Example 26 may include at least one non-transitory computer-readable medium comprising instructions stored thereon that, in response to execution of the instructions by a computing device, cause the computing device to: receive an alert signal from a restraining device in a vehicle that indicates the restraining device is in use; and activate a warning output based at least in part on the alert signal.

Example 27 may include the subject matter of Example 26, wherein the computing device is further caused to: send a vehicle status signal to the restraining device; receive an elevated alert signal from the restraining device; and activate an elevated warning output based at least in part on the elevated alert signal.

Example 28 may include the subject matter of any one of Examples 26-27, wherein the computing device is further caused to: activate an elevated warning output based at least in part on a vehicle status.

Example 29 may include the subject matter of Example 28, wherein to activate the elevated warning output includes to transmit an emergency signal including location information to an emergency services provider.

Example 30 may include the subject matter of any one of Examples 26-29, wherein to activate the warning output includes to activate at least one of a vehicle horn, a vehicle infotainment system, a vehicle climate control system, a vehicle light, a vehicle door locking mechanism, or a vehicle dashboard indicator.

Example 31 may include a restraint apparatus with alert, comprising: means for receiving a restraint indicator, the restraint indicator being sent based at least in part on whether a restraint is in a restraining position; means for receiving an attachment indicator, the attachment indicator being sent based at least in part on whether a securing component is engaged to couple an apparatus having the restraint and the securing component to a vehicle; and means for transmitting or causing to be transmitted, an alert signal based at least in part on the restraint indicator and the attachment indicator.

Example 32 may include the subject matter of Example 31, wherein causing comprises causing a wireless transmitter to transmit an alert signal when the restraint indicator indicates a restraint is in a restraining position and the attachment indicator indicates a securing component is engaged to couple a car seat with the vehicle, wherein the restraint apparatus further comprises means for causing the wireless transmitter to stop wirelessly transmitting the alert signal when at least one of the restraint indicator indicates the restraint is not in a restraining position or the attachment indicator indicates the securing component is not engaged to couple the car seat with the vehicle.

Example 33 may include the subject matter of any one of Examples 31-32, further comprising means for determining an activation state of a manual activation component, wherein the means for causing includes means for causing a wireless transmitter to transmit the alert signal based at least in part on the activation state of the manual activation component.

Example 34 may include the subject matter of any one of Examples 31-33, further comprising means for receiving a vehicle status indicator indicating a vehicle status of the vehicle, wherein the means for causing includes means for causing a wireless transmitter to transmit an elevated alert signal based at least in part on the vehicle status indicator.

Example 35 may include the subject matter of any one of Examples 31-34, further comprising means for establishing an ad-hoc network link with a personal communication device, wherein the means for causing includes causing a wireless transmitter to transmit the alert signal to the personal communication device over the established ad-hoc network link.

Example 36 may include a vehicular warning apparatus, comprising: means for receiving an alert signal from a restraining device in a vehicle that indicates the restraining device is in use; and means for activating a warning output based at least in part on the alert signal.

Example 37 may include the subject matter of Example 36, further comprising: means for sending a vehicle status signal to the restraining device; means for receiving an elevated alert signal from the restraining device; and means for activating an elevated warning output based at least in part on the elevated alert signal.

Example 38 may include the subject matter of of any one of Examples 36-37, further comprising: means for activating an elevated warning output based at least in part on a vehicle status.

Example 39 may include the subject matter of Example 38, wherein the means for activating the elevated warning output includes means for transmitting an emergency signal including location information to an emergency services provider.

Example 40 may include the subject matter of any one of Examples 36-39, wherein the means for activating the warning output includes means for activating at least one of a vehicle horn, a vehicle infotainment system, a vehicle climate control system, a vehicle light, a vehicle door locking mechanism, or a vehicle dashboard indicator.

Example 41 may include the subject matter of any one of Examples 26-30, further comprising instructions stored thereon that, in response to execution of the instructions by another computing device, cause the other computing device to: receive a restraint indicator that was sent based at least in part on whether a restraint is in a restraining position; receive an attachment indicator that was sent based at least in part on whether a securing component is engaged to couple an apparatus having the restraint and the securing component to a vehicle; and transmit or cause to be transmitted an alert signal based at least in part on the restraint indicator and the attachment indicator.

Example 42 may include the subject matter of Example 41, wherein causing comprises causing, by the other computing device, a wireless transmitter to transmit an alert signal when the restraint indicator indicates a restraint is in a restraining position and the attachment indicator indicates a securing component is engaged to couple a car seat with the vehicle, wherein the instructions further cause the other computing device to cause the wireless transmitter to stop wirelessly transmitting the alert signal when at least one of the restraint indicator indicates the restraint is not in a restraining position or the attachment indicator indicates the securing component is not engaged to couple the car seat with the vehicle.

Example 43 may include the subject matter of any one of Examples 41-42, wherein the other computing device is further caused to determine an activation state of a manual activation component, wherein the other computing device is to cause a wireless transmitter to transmit the alert signal based at least in part on the activation state of the manual activation component.

Example 44 may include the subject matter of any one of Examples 41-43, wherein the other computing device is further caused to receive a vehicle status indicator indicating a vehicle status of the vehicle, wherein the other computing device is to cause a wireless transmitter to transmit an elevated alert signal based at least in part on the vehicle status indicator.

Example 45 may include the subject matter of any one of Examples 41-44, wherein the other computing device is further caused to establish an ad-hoc network link with a personal communication device, wherein the other computing device is to cause a wireless transmitter to transmit the alert signal to the personal communication device over the established ad-hoc network link.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus with a restraint alert, comprising:
   a securing component to secure a safety seat, the safety seat having a restraint configurable into a restraining position to restrain an occupant of the safety seat;
   a first sensor to provide a restraint indicator based at least in part on the restraint of the safety seat is configured in the restraining position, restraining the occupant of the safety seat; and
   a second sensor coupled with the securing component to provide an attachment indicator based at least in part on the securing component is engaged to secure the safety seat;
   wherein presence of both the restraint indicator and the attachment indicator causes provision of a restraint alert signal.

2. The apparatus of claim 1, wherein the apparatus is the safety seat.

3. The apparatus of claim 1, wherein the safety seat is a child car seat, and the securing component is to secure the child car seat to a vehicle.

4. The apparatus of claim 1, further comprising:
   one or more processors; and
   an alert module operated by the one or more processors to cause the restraint alert signal to be transmitted based at least in part on the presence of both the restraint indicator and the attachment indicator.

5. The apparatus of claim 4, wherein the alert module is operated to cause the restraint alert signal to be wirelessly transmitted.

6. The apparatus of claim 5 further comprising a wireless transmitter to wirelessly transmit the restraint alert signal.

7. The apparatus of claim 4, wherein the alert module is further operated to stop causing the restraint alert signal to be transmitted when at least one of the restraint indicator no longer indicates the restraint is in the restraining position or the attachment indicator no longer indicates the securing component is engaged to secure the safety seat.

8. The apparatus of claim 4, further comprising a manual activation component, wherein the alert module is to cause the restraint alert signal to be transmitted based at least in part on an activation state of the manual activation component.

9. The apparatus of claim 4, wherein the safety seat is secured to a vehicle, and the alert module is operated to cause the restraint alert signal to be transmitted in a manner that indicates an escalated alert status based at least in part on a signal received indicating a vehicle status of the vehicle.

10. The apparatus of claim 9, further comprising a wireless receiver to receive the signal that indicates the vehicle status of the vehicle.

11. The apparatus of claim 4, wherein the alert module is to establish an ad-hoc network link with a personal communication device and cause the restraint alert signal to be transmitted to the personal communication device over the established ad-hoc network link.

12. A method for providing a restraint alert, comprising:
    sensing whether a restraint of a safety seat is configured in a restraining position restraining an occupant of the safety seat, and in response, generating a restraint indicator indicating the restraint is configured in the restraining position; and
    sensing whether a securing component is engaged to couple the safety seat to a vehicle, and in response, generating an attachment indicator indicating the securing component is engaged to couple the safety seat to the vehicle;
    wherein presence of both the restraint indicator and the attachment indicator causes a restraint alert signal to be transmitted.

13. The method of claim 12, further comprising wirelessly transmitting or causing wireless transmission of the restraint alert signal, based at least in part on the presence of both the restraint indicator and the attachment indicator.

14. The method of claim 13, further comprising stopping the wirelessly transmitting or stopping causing wireless transmission of the restraint alert signal when at least one of the restraint indicator no longer indicates the restraint is in the restraining position or the attachment indicator no longer indicates the securing component is engaged to secure the safety seat.

15. The method of claim 14, further comprising receiving a vehicle status indicator indicating a vehicle status of a vehicle to which the safety seat is secured, wherein the wirelessly transmitting or causing wireless transmission of the restraint alert signal comprises wirelessly transmitting or causing wireless transmission of the restraint alert signal in a manner that indicates an elevated alert state based at least in part on the vehicle status indicator.

16. The method of claim 13, further comprising determining an activation state of a manual activation component, wherein the wirelessly transmitting or causing wireless transmission of the restraint alert signal comprises wirelessly transmitting or causing wireless transmission of the restraint alert signal based at least in part on the activation state of the manual activation component.

* * * * *